United States Patent
Stavrou et al.

(10) Patent No.: US 8,973,570 B2
(45) Date of Patent: Mar. 10, 2015

(54) SYSTEM AND METHOD OF TRACKING SOLAR RADIATION

(75) Inventors: Paul Stavrou, Slatington, PA (US); David W. Catter, Sr., Woodland Park, CO (US)

(73) Assignee: Robert Bosch GmbH, Stuttgart (DE)

( * ) Notice: Subject to any disclaimer, the term of this patent is extended or adjusted under 35 U.S.C. 154(b) by 1103 days.

(21) Appl. No.: 12/551,343

(22) Filed: Aug. 31, 2009

(65) Prior Publication Data
US 2011/0048403 A1 Mar. 3, 2011

(51) Int. Cl.
*F24J 2/38* (2014.01)
*F24J 2/14* (2006.01)

(52) U.S. Cl.
CPC ..... *F24J 2/38* (2013.01); *F24J 2/14* (2013.01); *Y02E 10/47* (2013.01)
USPC ........... 126/573; 126/576; 126/581; 126/425; 126/572; 250/203 R; 250/548

(58) Field of Classification Search
USPC .................. 126/573, 581, 582, 570; 250/548; 33/366, 361
See application file for complete search history.

(56) References Cited

U.S. PATENT DOCUMENTS

| | | | | |
|---|---|---|---|---|
| 3,490,153 A | * | 1/1970 | Harris | 33/352 |
| 4,024,823 A | * | 5/1977 | Ward et al. | 172/4.5 |
| 4,445,030 A | * | 4/1984 | Carlton | 250/203.4 |
| 4,484,565 A | * | 11/1984 | Mori | 126/578 |
| 4,516,018 A | | 5/1985 | Bodenheimer et al. | |
| 4,794,245 A | | 12/1988 | Auer | |
| 4,997,146 A | * | 3/1991 | Weyandt, Jr. | 244/164 |
| 5,365,671 A | * | 11/1994 | Yaniger | 33/366.12 |
| 5,483,060 A | | 1/1996 | Sugiura et al. | |

(Continued)

FOREIGN PATENT DOCUMENTS

| | | |
|---|---|---|
| CN | 101482246 | 7/2009 |
| ES | 282215 | 5/1985 |
| WO | 2009091339 | 7/2009 |

OTHER PUBLICATIONS

Lee, Chia-Yen, et al., "Sun Tracking Systems: A Review", Sensors, pp. 3875-3890, doi:10.3390/s90503875, ISSN: 1424-8220, 2009.

(Continued)

*Primary Examiner* — Steven B McAllister
*Assistant Examiner* — Nikhil Mashruwala
(74) *Attorney, Agent, or Firm* — Michael Best & Friedrich LLP

(57) ABSTRACT

A solar tracking sensor and methods of tracking the sun. In one embodiment, the solar tracking sensor includes a housing, an inclinometer to output a signal indicative of the angle of the housing relative to the gravitational pull of the Earth, and first and second photosensors located on a first plane located within the housing. An opening on one side of the housing allows solar radiation to pass through the housing and reach the first and second photosensors. A difference calculating module is coupled to the first photosensor and the second photosensor. The difference calculating module determines a photosensor difference value using signals from the photosensors and outputs a photosensor difference value. The photosensor difference value can be used by a controller. The controller is coupled to the inclinometer determines whether the opening is aligned with the Sun based on the photosensor difference value and information or signal from the inclinometer.

11 Claims, 6 Drawing Sheets

(56) References Cited

U.S. PATENT DOCUMENTS

| | | | |
|---|---|---|---|
| 5,698,842 A | 12/1997 | Fallon et al. | |
| 5,734,371 A * | 3/1998 | Kaplan | 345/158 |
| 6,005,236 A * | 12/1999 | Phelan et al. | 250/203.4 |
| 6,465,766 B1 | 10/2002 | Zhang | |
| 6,899,096 B2 * | 5/2005 | Nakamura | 126/581 |
| 6,931,323 B2 * | 8/2005 | Choi et al. | 702/2 |
| 2008/0011288 A1 * | 1/2008 | Olsson | 126/576 |
| 2008/0126586 A1 * | 5/2008 | Shih | 710/10 |
| 2008/0128586 A1 | 6/2008 | Johnson et al. | |
| 2009/0068116 A1 * | 3/2009 | Arndt | 424/10.3 |
| 2010/0000518 A1 | 1/2010 | Chen et al. | |
| 2010/0059043 A1 | 3/2010 | Hong et al. | |
| 2011/0114079 A1 * | 5/2011 | Heckendorn | 126/574 |

OTHER PUBLICATIONS

Aiuchi, Kosuke, et al., "Sensor-Controlled Heliostat with an Equatorial Mount", Solar Engergy 80, pp. 1089-1097, Elsevier Ltd., 2006.

Aracil, C., et al., "Tracking System for Solar Power Plants", IEEE, pp. 3024-3029, 2006.

Quero, Jose, et al., "Tracking Control System Using an Incident Radiation Angle Microsensor", IEEE Transactions on Industrial Electronics, vol. 54, No. 2, pp. 1207-1216, Apr. 2007.

TroughNet, "Parabolic Trough Power Plant System Technology", National Renewable Energy Laboratory, available online at: <http://www.nrel.gov/csp/troughnet/power_plant_systems.html>, Jul. 25, 2008.

TroughNet, "Parabolic Trough Solar Field Technology", National Renewable Energy Laboratory, available online at: <http://www.nrel.gov/csp/troughnet/solar_field.html>, Mar. 2, 2009.

Written Opinion from the Spanish Patent Office for Application No. 201030401 dated Oct. 17, 2012 (Original and English Translation, 6 pages).

Office Action from the Spanish Patent Office for Application No. 201030401 dated May 17, 2013 (Original and English Translation, 8 pages).

Office Action from the Spanish Patent Office for Application No. 201030401 dated Aug. 12, 2013 (Original and English Translation, 7 pages).

\* cited by examiner

SYSTEM AND METHOD OF TRACKING SOLAR RADIATION

BACKGROUND

Embodiments of the invention relate to tracking movement of the Sun (or another light source). More specifically, the invention relates to methods and systems of tracking solar radiation, to control the alignment of solar collectors.

Solar collectors are used to capture energy generated by the Sun. Solar hot-water panels and photovoltaic panels have been used, for example, to help heat hot water in homes and to generate electricity, for example, for spacecraft. On a larger scale, a thermal solar power plant uses the heat from the Sun to generate relatively large amounts of electrical power. A thermal solar power plant uses an array of solar collectors containing mirrors to focus solar radiation on a metal tube containing a fluid that can operate at high temperatures, and has a relatively high heat capacity or specific heat. The energy focused by the collectors to the tube heats the fluid. The fluid is pumped to a "power block" or generation plant. The heated fluid is used to produce steam, which, in turn, is used to drive a turbine to generate electrical power.

SUMMARY

Although it is recognized that the orientation of a solar collector with respect to the Sun is a factor in the performance of the collector, a number of existing sensors for tracking the movement of the Sun and systems for aligning collectors with the Sun so as to increase the amount of energy captured are not (in the inventors' opinion) completely satisfactory.

In one embodiment, the invention provides a solar tracking system. The solar tracking system includes a housing, an inclinometer to output a signal indicative of the angle of the housing relative to the gravitational pull of the Earth, and first and second photosensors on a first plane located within the housing. The first photosensor includes a first output and the second photosensor includes a second output. The solar tracking sensor includes an opening on one side of the housing. The opening allows solar radiation to pass through the housing and reach the first and second photosensors. The solar tracking system also includes a difference calculating module and a controller. The difference calculating module is coupled to the first output and to the second output and it determines a photosensor difference value using signals from the first output and the second output. The difference calculating module outputs the photosensor differential value on a differential value output. The controller is coupled to the inclinometer to receive the signal indicative of the angle of the housing and coupled to the differential value output to receive the photosensor difference value. The controller determines whether the opening is aligned with the Sun.

In another embodiment the invention provides a method of solar tracking. The method includes receiving solar radiation passing through an opening of a solar tracking sensor housing at first and second photosensors inside the solar tracking sensor housing. The solar tracking method also includes obtaining an inclinometer signal indicating an angle of the solar tracking sensor housing relative to the gravitational pull of the Earth, obtaining a first signal from a first photosensor indicative of the magnitude of the solar radiation received by the first photosensor, and obtaining a second signal from a second photosensor indicative of the magnitude of the solar radiation received by the second photosensor. In addition, the method includes determining a differential value based on the difference between the first signal and the second signal, and repositioning the solar tracking sensor housing based on at least one of the differential value and the inclinometer signal.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

As should also be apparent to one of ordinary skill in the art, the systems shown in the figures are models of what actual systems might be like. Many of the modules and logical structures described are capable of being implemented in software executed by a microprocessor or a similar device or of being implemented in hardware using a variety of components including, for example, application specific integrated circuits ("ASICs"). Terms like "controller" may include or refer to both hardware and/or software. Furthermore, throughout the specification capitalized terms are used. Such terms are used to conform to common practices and to help correlate the description with the coding examples, equations, and/or drawings. However, no specific meaning is implied or should be inferred simply due to the use of capitalization. Thus, the claims should not be limited to the specific examples or terminology or to any specific hardware or software implementation or combination of software or hardware.

Figure 1:
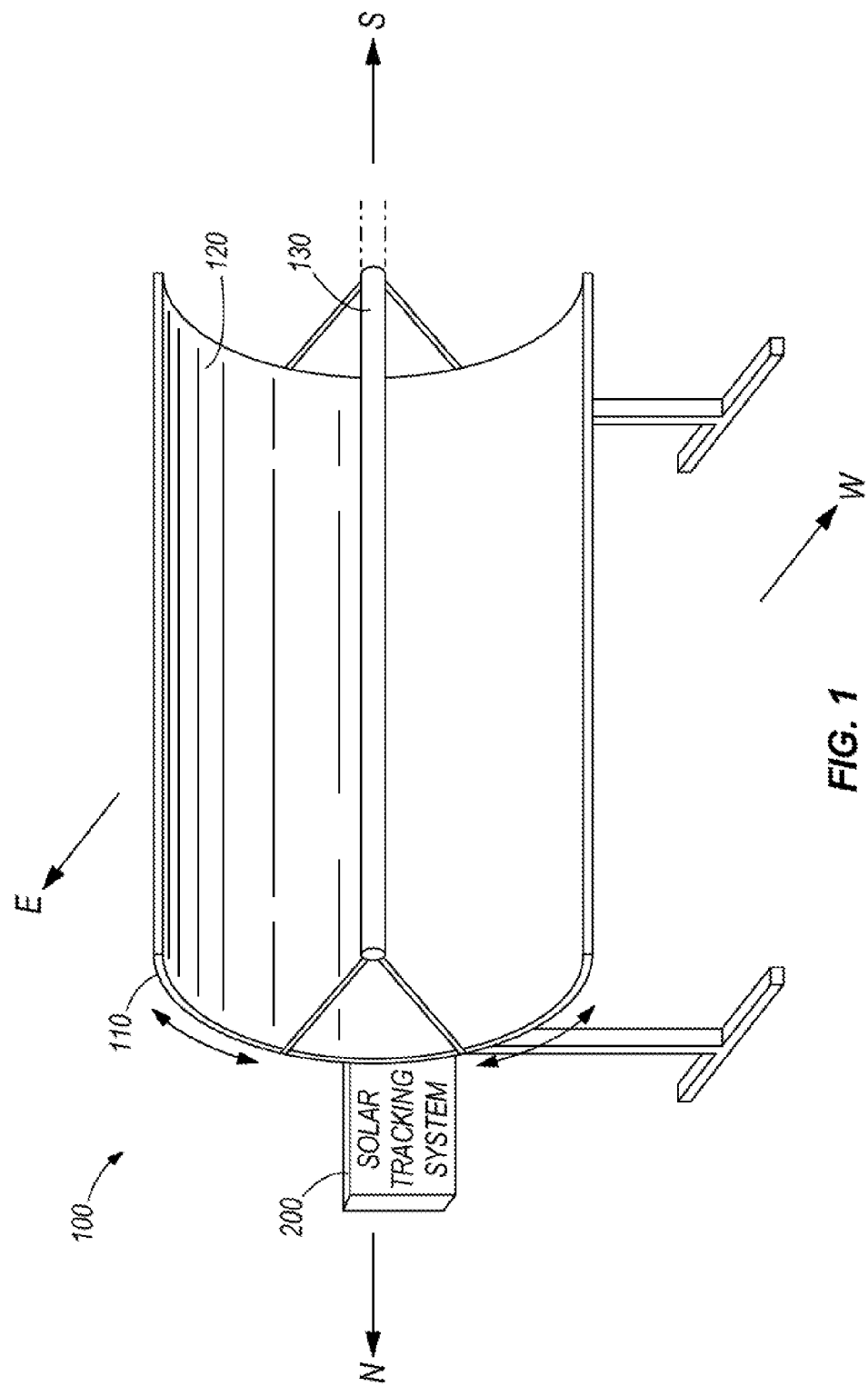
FIG. 1 illustrates an exemplary solar tracking system with a parabolic trough solar collector according to an embodiment of the invention.

FIG. 1 depicts an exemplary parabolic trough solar collector system 100 according to an embodiment of the invention. The parabolic trough solar collector system 100 includes a parabolic trough solar collector 110 with parabolic reflector 120, absorber tube 130 (i.e., a heat collecting pipe), and solar tracking system 200. The parabolic reflector 120 focuses incoming sunlight onto the absorber tube 130 located slightly above and centered along the length of the trough. The parabolic trough solar collector 110 is aligned with the geometric north and geometric south poles of the Earth as shown in FIG. 1. The parabolic trough solar collector 110 is attached to drive mechanism 250 (not shown in FIG. 1) capable of rotating the parabolic trough solar collector 110 to face from at least due east to due west along the north-south axis of the parabolic trough solar collector 110. As the Sun transits the sky, the drive mechanism 250 (e.g., a hydraulic drive system) rotates the parabolic trough solar collector 110 until it reaches the western limits so that the incoming sunlight is always focused on the absorber tube 130.

The Sun transits the sky differently (i.e., higher or lower) depending on the time of the Earth calendar. In the northern hemisphere, the Sun is highest at the summer solstice (June 20-22) and lowest at the winter solstice (December 20-22). The total change of angle from the two solstices is approximately 48 degrees seasonally. Even though the sunlight changes its incoming angle depending on the season, if the parabolic trough solar collector system 100 is precisely pointed at the Sun from sunrise to sunset, the light will still focus on the absorber tube 130.

The more precise the parabolic trough solar collector 110 is able to follow the Sun, the more energy the parabolic trough solar collector system 100 can capture. As will be described below, the solar tracking system 200 (and other embodiments of the invention) allow the parabolic trough solar collector 110 to precisely follow the Sun at a relatively low cost, with low wear, and reduced mechanical problems. Cost, wear, and mechanical problems are important factors in solar tracking design for solar collectors because each factor is amplified when solar collectors are used in large arrays (e.g., 500 or more collectors).

Figure 2:
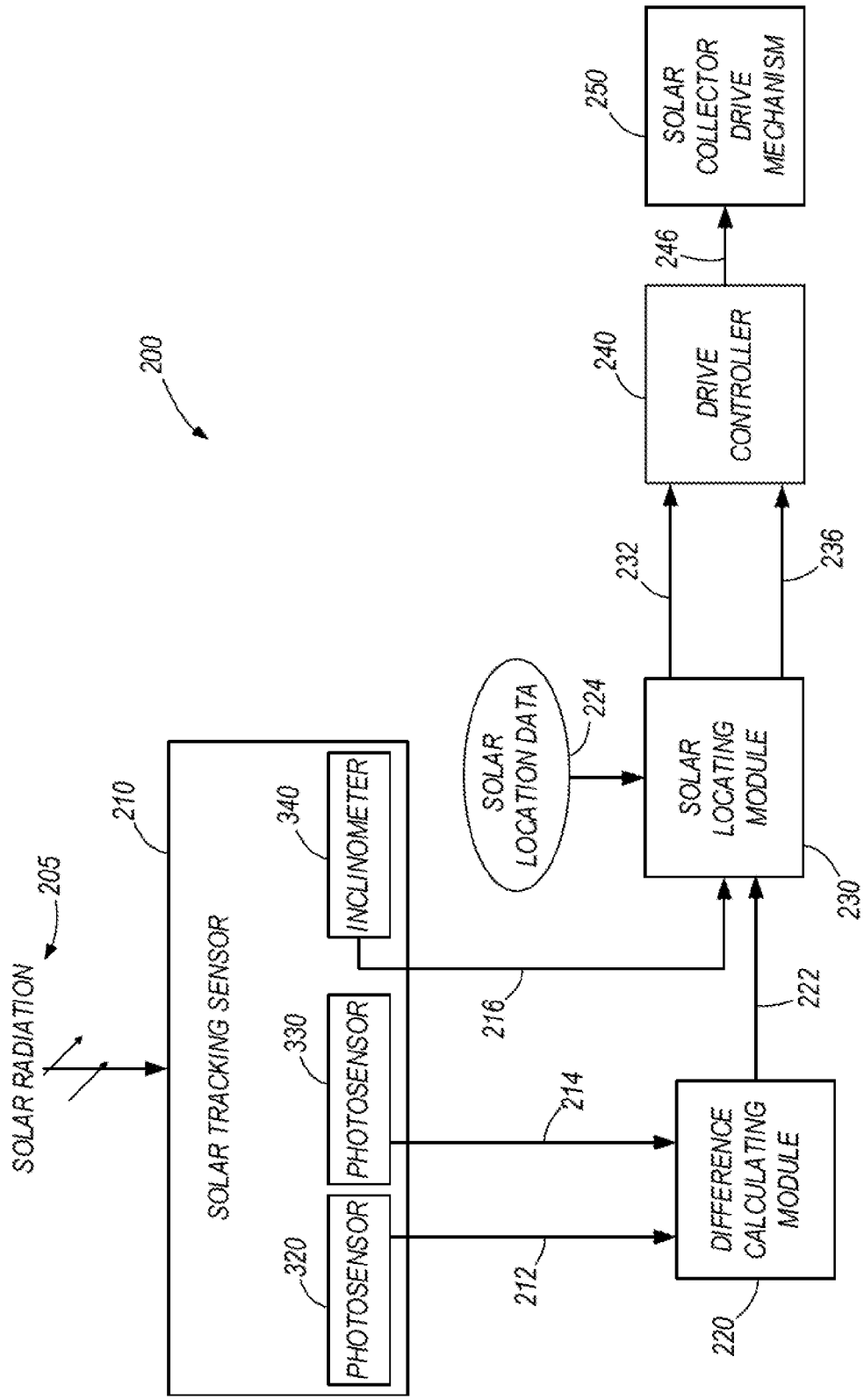
FIG. 2 is a block diagram of an exemplary solar tracking system according to an embodiment of the invention.

FIG. 2 depicts components of one exemplary embodiment of a solar tracking system 200. A solar tracking sensor 210, which contains two photosensors 320 and 330, receives solar radiation 205. The photosensor 320 outputs a signal (via a first sensor output 212) indicating the magnitude of solar radiation that the photosensor 320 receives. The second photosensor 330 outputs a signal indicating the magnitude of solar radiation that it receives via a second sensor output 214. The solar tracking sensor 210 also includes an inclinometer 340. The inclinometer 340 outputs a signal via output 216 that indicates the angle of the solar tracking sensor relative to the gravitational pull of Earth. In one embodiment, the inclinometer measures the angle of the solar tracking sensor 210 about the north-south axis. In one example, the output signal can indicate anywhere from 0 to 180 degrees. This range of values covers circumstances anywhere from a position where the parabolic trough solar collector 110 is facing directly east, a position where the solar collector is facing directly up (direction opposite gravity), to a position where the solar collector is facing directly west.

A difference calculating module 220 receives the two solar radiation magnitude values from the first sensor output 212 and second sensor output 214. The difference calculating module 220 calculates the difference between the two solar radiation magnitude values and outputs the resulting difference value via output 222. In some embodiments, the difference calculating module 220 is or includes a programmable microprocessor or similar device and also forwards the raw magnitude values to a memory (or other storage) for record keeping purposes.

A solar locating module 230 receives the inclinometer signal via output 216, and the difference value via output 222. The locating module 230 also receives solar location data 224. The solar location data 224 can be supplied, for example, by a user input device (e.g., keyboard or mouse), a local or external network database or computer, or the Internet. In one embodiment, the solar location data 224 includes solar coordinates externally calculated based on the current date, time of day, geographic latitude and longitude, and geometric transforms for the trough axis. In other embodiments, the solar location data 224 can include some or all of the current date, time of day, geographic latitude, and longitude, and geometric transforms for the trough axis. The solar locating module 230 determines the position of the Sun using the difference value and the solar location data 224. The solar locating module also determines the direction that the parabolic trough solar collector 110 is facing using the inclinometer 340 signal. The solar locating module 230 outputs or provides a signal or signals via output 236 to the drive controller 240 indicating the relative position of the parabolic trough solar collector 110 and the Sun, based on the inclinometer signal and solar location data. The solar locating module 230 also outputs to the drive controller 240 signals indicating the relative position of the parabolic trough solar collector 110 and the Sun via output 232 based on the difference value. Like the difference calculating module 220, the solar locating module can be or includes a programmable microprocessor or similar device. In some embodiments, the solar locating module has a single multiplexed output in place of outputs 232 and 236.

Drive controller 240 (e.g., a microprocessor or similar device and associated devices, such as memory) uses the relative position information received via output 236 to determine whether the solar collector 260 should be repositioned to track the sun or improve the efficiency of its solar radiation collection or both. If the drive controller 240 determines that a repositioning is appropriate, the drive controller 240 sends drive control signals via output 246 to solar collector drive mechanism 250. The solar collector drive mechanism 250, in turn, repositions the solar collector 260 as directed by the drive controller 240. As such, the solar tracking system 200 detects the location of the Sun and repositions the solar collector 260 to maximize the solar radiation received by the solar collector 260.

The solar tracking sensor 210, difference calculating module 220, solar locating module 230, drive controller 240, and solar collector drive mechanism 250 are shown separately in the embodiment of FIG. 2. However, some or all of the components may be combined into one device or housing. For instance, the difference calculating module 220 may be integrated into the solar tracking sensor 210 in one embodiment. In this embodiment, the difference value is computed within the solar tracking sensor 210 and only one output (the difference value output) is necessary, rather than both the first sensor output 212 and second sensor output 214. In other embodiments, the solar locating module 230 and drive controller 240 are combined into a single controller module. In still other embodiments, the solar locating module 230 and drive controller 240 (either as separate or integrated modules) receive data from a plurality of solar tracking sensors 210 and control the position of each of their related parabolic trough solar collectors 110.

Figure 3:
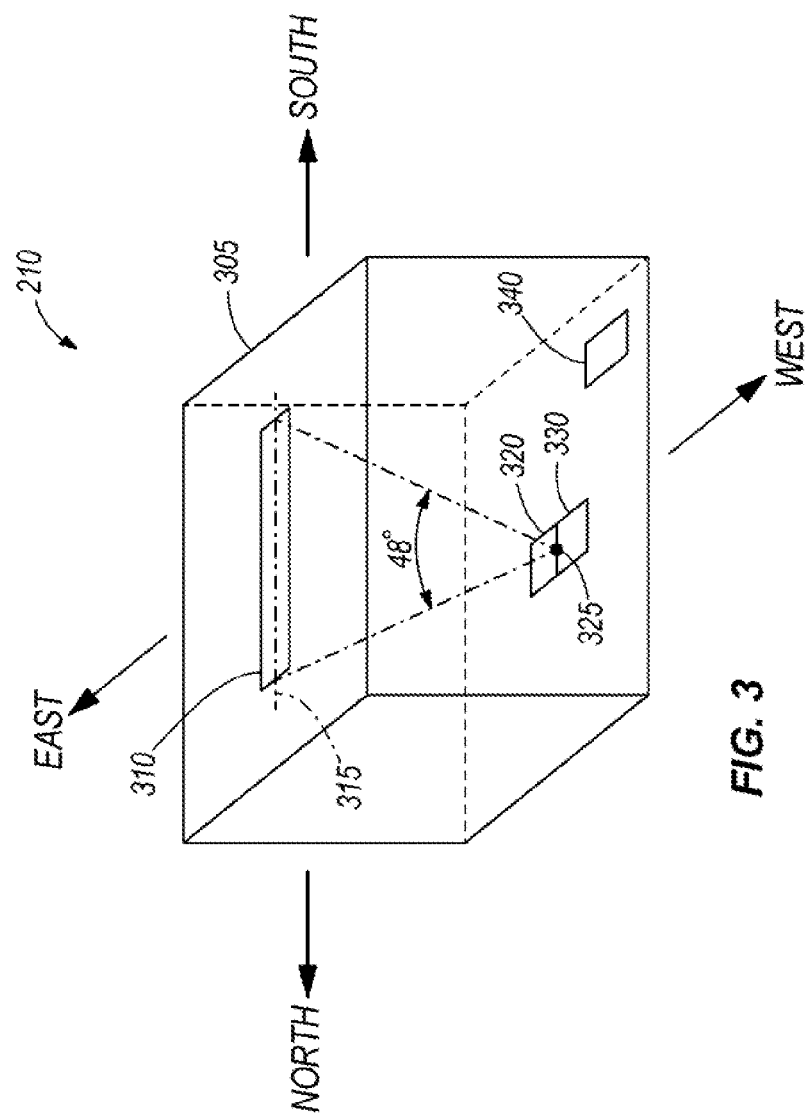
FIG. 3 illustrates an exemplary solar tracking sensor according to an embodiment of the invention.

FIG. 3 illustrates an exemplary solar tracking sensor 210 according to an embodiment of the invention. Solar tracking sensor 210 includes a slit 310 with principal axis 315. The light beam entering the slit 310 is relatively uniform in intensity along the length of the slit. As the Sun's angle in the sky varies from a low angle to high angle due to seasonal variations, the narrow light beam illuminates the detectors in a relatively constant manner. This consistency makes the solar detector insensitive to seasonal variations, while preserving the angular sensitivity that occurs while tracking during a day. In some embodiments, the length of the slit 310 along the principal axis 315, and the distance between the slit 310 and the photosensors 320 and 330, are chosen such that as the Sun's angle in the sky varies from a low to high by season, the solar tracking sensor 210 does not need to be rotated north or south along the east-west axis. For instance, by positioning the photosensors 320 and 330 near enough to the slit 310, and choosing a large enough slit 310 length, the photosensors 320 and 330 receive solar radiation over approximately 48 degrees of solar movement in the north-south direction. Choosing such slit dimensions allows the solar tracking sensor to only require rotation about one axis, that is, east-west rotation along the north-south axis.

Figure 5:
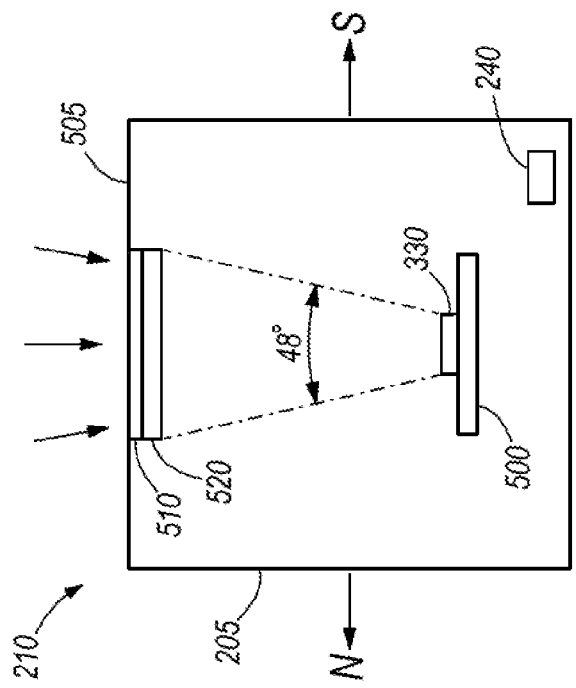
FIG. 5 illustrates a profile view of an exemplary solar tracking sensor according to an embodiment of the invention.

In one embodiment, the slit may be formed by a physical gap in a housing cap 505 or in a metal 520 or other rigid material that is secured to the housing cap 505 (see FIG. 5). In another embodiment, the housing cap 505 includes an opaque window with a transparent slit-shaped area. In this embodiment the window is created by depositing opaque metal on transparent glass, selectively omitting metal deposits from the slit-shaped transparent region of the window. This window arrangement allows simpler assembly while providing the benefits of the ultraviolet light blocking window described below.

In one embodiment, a window 510 (see FIG. 5) is provided above the slit 310 such that the solar radiation must pass through the window before entering into the sensor housing 305. Using a slit or similar means to limit the amount of light and radiant energy entering the sensor improves the life and reduces heating (caused by infrared radiation) of the internal components. The window 510 also helps to prevent ultraviolet radiation, which may harm internal components, from entering the sensor housing 305, while allowing other solar radiation to pass through. In other embodiments the window 510 is positioned below the slit. In still other embodiments, as described above, the window and slit are a one-piece construction where the window is opaque except for a slit-shaped portion that allows in non-ultraviolet light to enter the sensor housing 305.

The solar tracking sensor 210 also includes an inclinometer 340. The inclinometer 340 includes an output 216 for sending an electric signal indicative of the inclinometer's position relative to the Earth's gravitational pull. In one embodiment, signals indicating 0 degrees represent due east, 90 degrees represent a vertical direction or directly up (opposite gravity), and 180 degrees represent due west. In some embodiments, the inclinometer has an accuracy less than 0.05 degrees over 180 degrees of measurement, which is less than the desired overall accuracy for the parabolic trough solar collector 110. Although higher accuracy inclinometers may be used, a lower accuracy inclinometer will reduce the cost of the solar tracking system 200.

To achieve the desired accuracy of solar tracking, the solar tracking sensor uses information from the photosensors 320 and 330. The photosensors 320 and 330 output an electric signal in response to stimulation from receiving radiation, such as solar radiation, on the photosensors' surface. The electric signal generated by the photosensors 320 and 330 may be an analog signal or converted to a digital signal.

In one embodiment, the photosensors 320 and 330 are positioned within the sensor housing 305 such that photosensor 330 is west of photosensor 320. The west side of photosensor 320 abuts the east side of photosensor 330 and the abutting sides form a boundary or line 325 and the line 325 forms a plane with the principal axis 315 that is orthogonal to a light receiving plane ("LRP") of the photosensors 320 and 330. Although FIG. 3 depicts the photosensors 320 and 330 on the bottom of the sensor housing 305, embodiments of the invention contemplate the photosensors 320 and 330 being secured to an elevated platform. The elevated platform provides room under the sensors for electric connections beneath the photosensors 320 and 330.

Incoming sunlight generates a long, narrow beam of light as it passes through the slit 310. The photosensors 320 and 330, in combination, measure the relative angle of the incoming light along the narrow width of the light beam. For instance, if the Sun is directly above the slit, each of the photosensors 320 and 330 receives an equal amount of solar radiation. Thus, the difference between the signals output from the photosensors 320 and 330 is zero. If, however, the incoming sunlight is entering the slit at an angle, the photosensors 320 and 330 receive a different amount of solar radiation and output different values on outputs 212 and 214. The sign and magnitude of the difference indicates the angle of the received solar radiation 205 on the solar tracking sensor 210.

Figure 4:
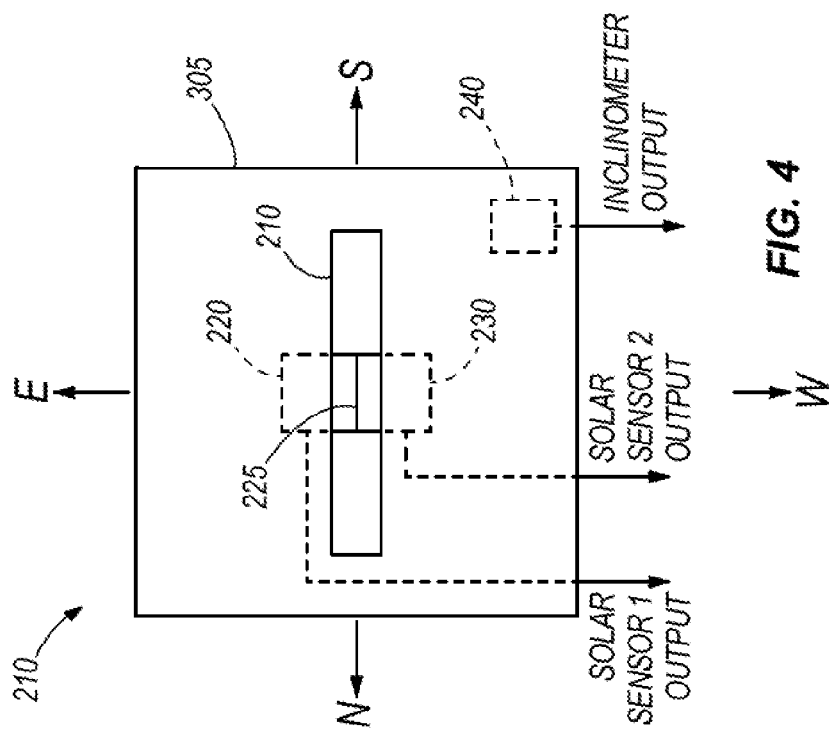
FIG. 4 illustrates a top view of an exemplary solar tracking sensor according to an embodiment of the invention.

FIG. 4 illustrates a top view (looking down) of the solar tracking sensor 210 depicted in FIG. 3. FIG. 5 illustrates a profile view (looking east) of the solar tracking sensor 210 depicted in FIG. 3. The solar tracking sensor 210 is shown including window 510 and metal 520, which are not depicted in FIG. 3 or 4. The photosensor 330 is shown in an elevated position atop a connection board 500. The elevated platform may be secured to the sensor housing 305 from the top, bottom, or a sidewall. In one embodiment, the sensor housing 305 includes a removable housing cap 505 fastened to the sensor housing 305. The slit 310, the window 510, the photosensors 320 and 330, and the inclinometer 340 are secured to the housing cap 505 to improve ease of assembly and replacement in the field.

In embodiments of the invention, the sensor housing 305 is sealed to prevent environmental contamination (e.g., from water, dirt, etc). The seal enables the solar tracking sensor 210 to maintain accurate tracking over a greater lifespan, reducing the maintenance and replacement costs of the sensor. In addition, in some embodiments of the invention, the photosensors 320 and 330 are monolithic (i.e., formed on a single semiconductor substrate) to reduce or eliminate differences in tolerances and sensitivities between the photosensors. In addition, degradation of performance of the photosensors 320 and 330 over time (e.g., from constant solar exposure) will be experienced equally by both photosensors 320 and 330. The solar tracking sensor 210, however, relies on relative measurements of the sensors, not absolute values. As the photosensors 320 and 330 will degrade together, the relative measurements are unlikely to change or become less accurate overtime. Further, the relative measurements will help eliminate other small variations in signal output linearity due to absolute light levels and temperature.

Figure 6:
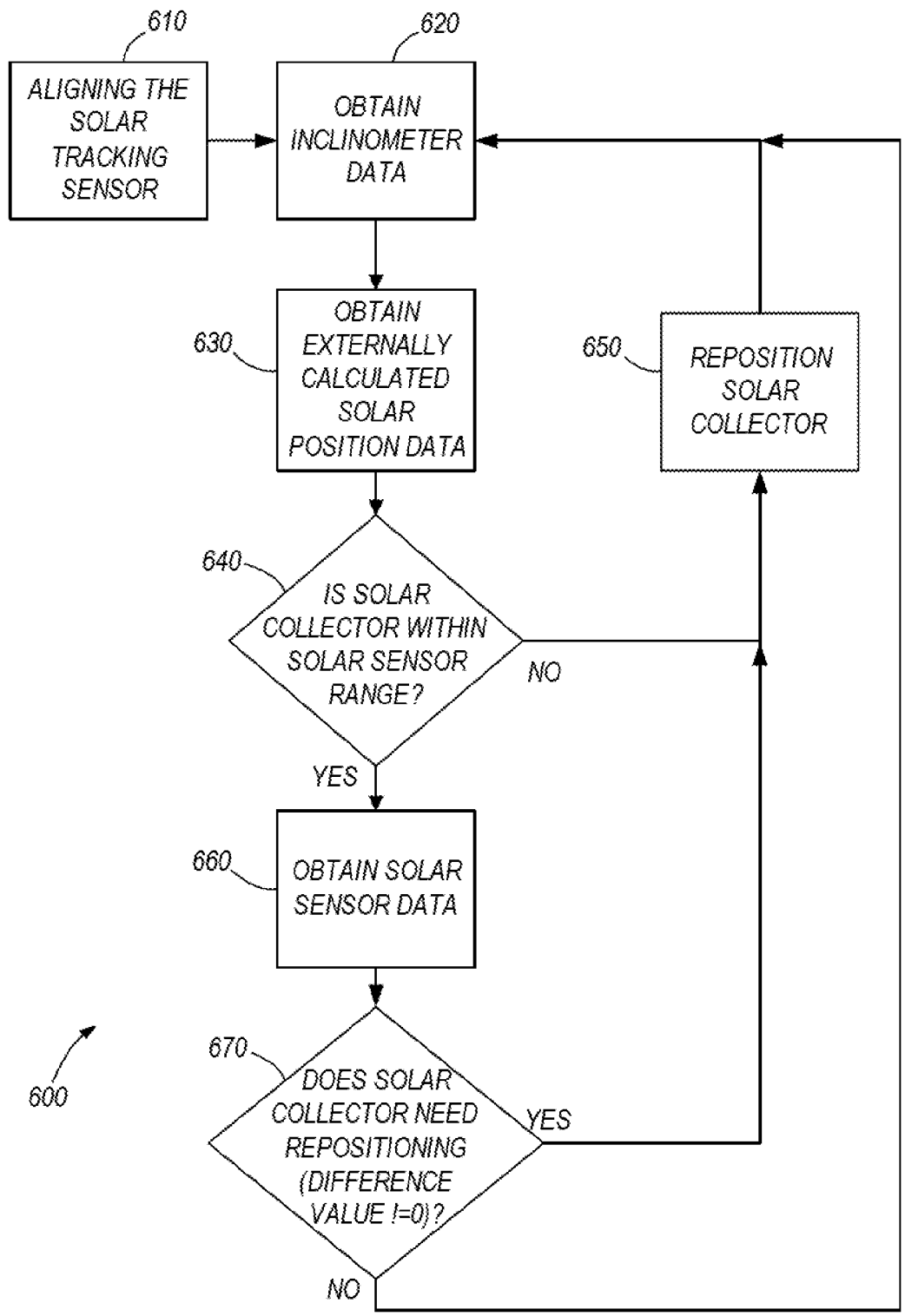
FIG. 6 illustrates an exemplary process for solar tracking according to an embodiment of the invention.

FIG. 6 illustrates a process 600 for tracking solar radiation using a solar tracking system (e.g., the solar tracking system 200) for positioning a solar collector (e.g., the parabolic trough solar collector 110). Although process 600 is described using the solar tracking system 200 shown in FIGS. 2-4 and parabolic trough solar collector 110, the process may be used with other embodiments of the solar tracking system 200 and may be used to position other types of solar collectors. In step 610, the solar tracking sensor 210 is positioned on the parabolic trough solar collector 110 such that the principal axis 315 is aligned with the Earth's geographic north-south axis. In one embodiment, the principal axis 315 of the solar tracking sensor 210 must be aligned within 0.1 degree of the long axis of the parabolic trough solar collector 110, which is also aligned with the Earth's geographic north-south axis.

In step 620, the solar locating module 230 obtains inclinometer data from the solar tracking sensor 210 via output 216. The data or signal from the inclinometer indicates the angle of the solar tracking sensor 210 (e.g., 35 degrees above the east-west axis). In step 630, the solar locating module 230 obtains solar location data 224. The solar locating module 230 determines the position of the Sun using the solar location data 224 (e.g., 45 degrees above the east-west axis). In step 640, the solar locating module 230 compares the calculated position of the Sun with the angle of the solar tracking sensor 210 and determines an absolute degree difference value (e.g., |45−35|=10 degrees). The solar locating module 230 compares the absolute difference value with a pre-programmed range to determine if the solar tracking sensor 210 is within a solar sensor range. In one embodiment, the solar sensor range is 5 degrees. If the absolute difference value is greater than the solar sensor range, the solar locating module 230 outputs the relative position of the solar tracking sensor 210 and the Sun (e.g., +10 degrees) to the drive controller 240. In step 650, the drive controller 240 then sends control signals to the drive mechanism 250 to focus (or point) the parabolic trough solar collector 110 toward the calculated position of the Sun (e.g., 45 degrees). Thereafter, the process returns to step 620.

In step 640, if the solar locating module 230 determines that the solar tracking sensor 210 is within the solar sensor range (e.g., the parabolic trough solar collector 110 is within 5 degrees of the calculated position of the Sun), the solar locating module 230 obtains the difference value via output 222. The difference calculating module 220 obtains the outputs of the photosensors 320 and 330 via outputs 212 and 214, respectively. The difference value represents the difference in magnitudes of the solar radiation received by the photosensors 320 and 330.

In step 670, the solar locating module 230 determines if the parabolic trough solar collector 110 requires repositioning. If the difference value 222 is zero, then the photosensors 320 and 330 have received the same amount of solar radiation. Thus, the parabolic trough solar collector 110 is properly directed at the Sun and the process returns to step 620. If the difference value is less than zero or greater than zero, the process returns to step 650 because the parabolic trough solar collector 110 is not directly facing the Sun and requires repositioning. For instance, if the parabolic trough solar collector 110 is facing too far east, photosensor 320 receives more solar radiation and than photosensor 330. In turn, the signals on outputs 212 and 214 indicate that the photosensor 320 received a greater magnitude of solar radiation than photosensor 330.

In step 650, the drive controller 240 receives the difference value via output 232 then sends control signals to the drive mechanism 250 to focus (point) the parabolic trough solar collector 110 towards the Sun based on the difference value. The greater the absolute value of the difference value, the greater the adjustment required to direct the parabolic trough solar collector 110 towards the Sun. If the difference value is positive, the drive mechanism 250 rotates the parabolic trough solar collector 110 one way (e.g., west). If the difference value is negative, the rotation is in the opposite direction (e.g., east). After the adjustment in step 650, the process returns to step 620. The process repeats such that the solar tracking system 200 continuously tracks the Sun as it moves across the sky through the day.

Figure 7:
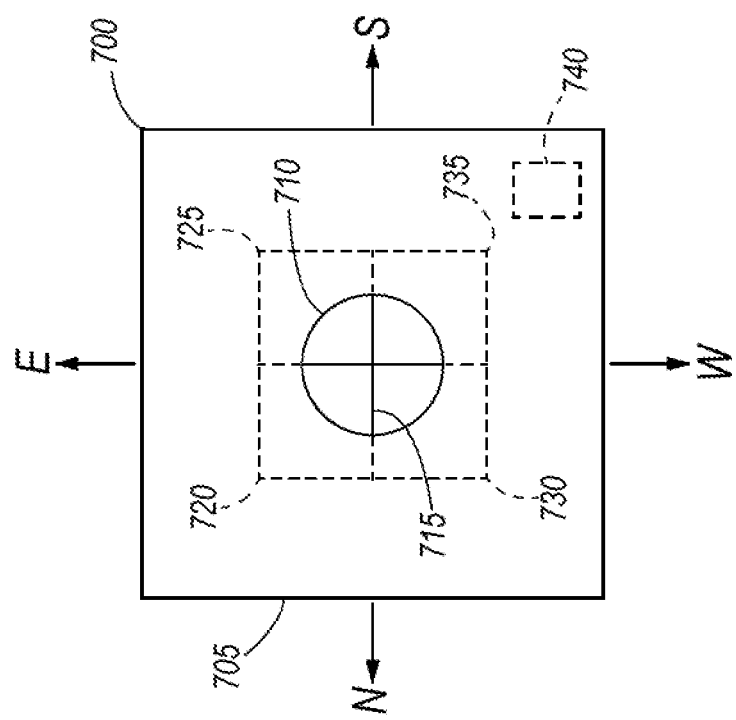
FIG. 7 illustrates a top view of an exemplary solar tracking sensor having a circular aperture according to an embodiment of the invention.

In other embodiments of the invention, a quad-photosensor arrangement is used. In FIG. 7, a top view of the circular solar tracking sensor 700 is illustrated with abutting photosensors 720, 725, 730, and 735. The photosensors 720, 725, 730, and 735 may be secured to the sensor housing 705 in a manner similar to the photosensors 320 and 330 of the solar tracking sensor 210. In contrast to the solar tracking sensor 210, the sensor 700 has a circular aperture 710. The circular aperture is located above the photosensors 720, 725, 730, and 735. The Principal Axis 715 of the circular aperture 710 extends north to south and directly above the east-west abutting boundary of the photosensors 720 and 730 and photosensors 725 and 735. The circular aperture 710 may be formed in a manner similar to that of the slit 310 and similarly may include an ultraviolet light-blocking window.

A cylindrical beam of light is generated as incoming light passes through the circular aperture 710. The photosensors 720, 725, 730, and 735, in combination, measure the relative angle of the incoming light. For instance, if the Sun is directly above the circular aperture 710, the photosensors 720, 725, 730, and 735 receive an equal amount of solar radiation. In such as case, the difference between the signals output from the photosensors 720, 725, 730, and 735 is zero. If, however, the incoming sunlight enters the circular aperture 710 at an angle, each of the photosensors 720, 725, 730, and 735 receives a different amount of solar radiation and output different values. The quad-photosensor arrangement of the circular solar tracking sensor 700 can be used to indicate the east-west angle as well as the north-south angle of the Sun.

Figure 8:
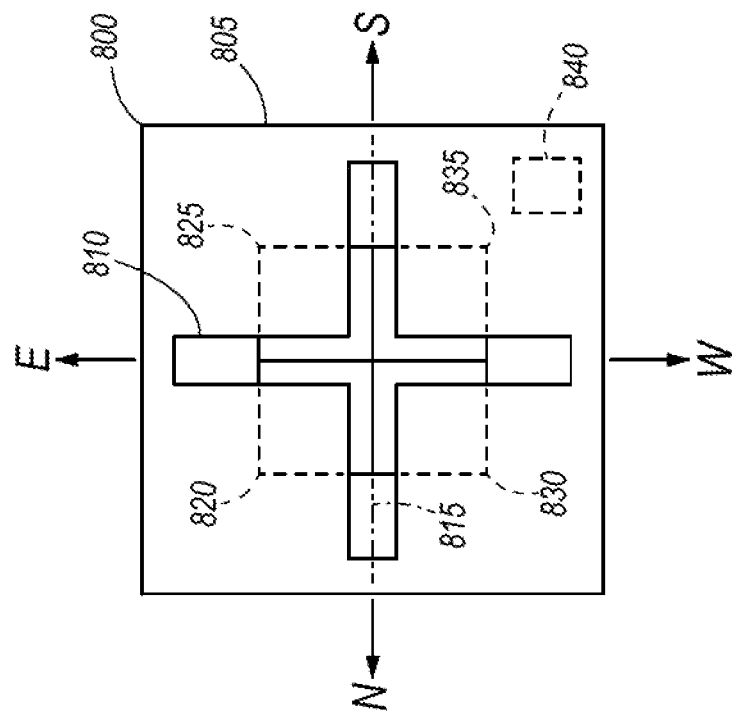
FIG. 8 illustrates a top view of an exemplary solar tracking sensor having a cross-shaped aperture according to an embodiment of the invention

In FIG. 8, a top view of a solar tracking sensor 800 is illustrated. The sensor 800 has a housing 805, a cross-shaped aperture 810 with a principal axis 815, and four photosensors 820, 825, 830, and 835. The photosensors 820, 825, 830, and 835 are secured to the housing 805 in a manner similar to the photosensors 320 and 330 of the solar tracking sensor 210. The cross-shaped aperture 810 is positioned above the photosensors 820, 825, 830, and 835. The principal axis 815 of the cross-shaped aperture 810 extends north to south and directly above the east-west abutting boundary of the photosensors 820 and 830 and photosensors 825 and 835. The cross aperture 810 may be formed in a manner similar to that of the slit 310 and similarly may include an ultraviolet light-blocking window.

Incoming sunlight is focused into a cross- or x-shape as it passes through the cross-shaped aperture 810. The photosensors 820, 825, 830, and 835, in combination, measure the relative angle of the incoming light. For instance, if the Sun is directly above the cross-shaped aperture 810, the photosensors 820, 825, 830, and 835 receive an equal amount of solar radiation, and the difference between the signals output from the photosensors 820, 825, 830, and 835 is zero. If, however, the incoming sunlight enters the cross-shaped aperture 810 at an angle, the photosensors 820, 825, 830, and 835 receive a different amount of solar radiation and output different values. The quad-photosensor arrangement of the solar tracking sensor 800 can be used to indicate the east-west angle as well as the north-south angle of the Sun.

In some embodiments of the invention, the circular solar tracking sensor 700 and the cross-shaped solar tracking sensor 800 are used with solar collectors that use a multi-axis driving mechanism. Therefore, the solar collectors can be positioned to track the Sun east and west (sunrise to sunset) as well as north and south (between solstices). In some embodiments a multi axis inclinometer is used or two single axis inclinometers are used to provide an output indicating the angle relative to gravity of a solar collector along both the north-south axis and the east-west axis.

The circular solar tracking sensor 700 and the cross-shaped solar tracking sensor 800 may be used in solar tracking system 200 and process 600 with only minor alterations to the execution of the steps to accommodate multiple axis information. In step 610, the circular solar tracking sensor 700 or the cross-shaped solar tracking sensor 800 is aligned along both the north-south axis and the east-west axis as shown in FIGS. 7 and 8. In step 620, the solar locating module 230 compares solar location data 224 with the multi-axis inclinometer data. If the north-south angle or the east-west angle of the circular solar tracking sensor 700 and the cross-shaped solar tracking sensor 800 are outside the solar sensor range for each axis, the drive controller 240 outputs appropriate control signals to adjust the solar collector drive mechanism 250. If both the north-south angle and the east-west angle are within the solar sensor range, the process moves to step 660.

In step 660, the difference calculating module 220 receives the signals of each of the four photosensors. One exemplary method of calculating the necessary adjustment of a multi-axis solar collector using the information provided by the quad photosensor arrangements (step 670) can be described with reference to FIG. 7. First, a controller calculates the difference of 1) the sum of the outputs from photosensors 720 and 725 and 2) the sum of the outputs from photosensors 730 and 735. This first calculation provides an indication whether the solar collector must be rotated in the east or west direction. Second, the controller calculates the difference of 1) the sum of the outputs from photosensors 720 and 730 and 2) the sum of the outputs from photosensors 725 and 735. This second calculation provides an indication of whether the solar collector must be rotated in the north or south direction. If the first calculation equals zero, the solar collector does not need to be adjusted along the east-west axis. If the second calculation equals zero, the solar collector does not need to be adjusted along the north-south axis. If repositioning on either axis is required, the solar collector's position is adjusted as needed in step 650. Otherwise, the process returns to step 620 and continues to track the Sun.

Thus, the invention provides, among other things, an improved solar tracking system and method that uses photosensor and inclinometer data. Various features and advantages of the invention are set forth in the following claims.

What is claimed is:

1. A solar tracking system comprising:
   a housing configured to rotate only about a single axis, wherein the orientation of the single axis is fixed relative to the housing;
   a drive mechanism configured to rotate the housing only about the single axis;
   an inclinometer to output a signal indicative an angle of the housing relative to the gravitational pull of the Earth;
   a first photosensor and a second photosensor located within the housing, wherein the first photosensor includes a first output and the second photosensor includes a second output, wherein the first photosensor is positioned such that a center point of the first photosensor is a first linear distance from a center point of the second photosensor;
   a linear slit on one side of the housing positioned parallel to the single axis and perpendicular to the first linear distance, wherein the slit allows solar radiation to pass through the housing and reach the first and second photosensors wherein the linear slit has dimensions allowing solar radiation to reach the first and second photosensors over at least 48 degrees of solar variation along the single axis;
   a difference calculating module coupled to the first output and the second output, wherein the difference calculating module determines a photosensor difference value using signals from the first output and the second output and has a differential value output to transmit the photosensor difference value, wherein the photosensor difference value includes a magnitude and a sign indicative of a difference between the first output and the second output; and
   a controller coupled to the inclinometer configured to
   receive the signal indicative of the angle of the housing and to receive the photosensor difference value,
   determine whether the opening is aligned with the Sun based on the photosensor difference value,
   determine a rotation amount based on the magnitude of the photosensor difference value,
   determine a direction of rotation based on the sign of the photosensor difference value, and
   rotate the housing about the single axis based on the determined rotation amount and the determined direction of rotation.

2. The solar tracking system of claim 1, wherein the controller determines whether the linear slit is aligned with the Sun based on at least one from the group consisting of
   the magnitude and the sign of the photosensor difference value, and
   an inclinometer difference value based on a comparison of a calculated angle of the Sun with the signal indicative of the angle of the housing.

3. The solar tracking system of claim 2, further comprising a drive controller and a solar collector.

4. The solar tracking system of claim 3, wherein the drive controller is coupled to
   the controller to receive the photosensor difference value and the inclinometer difference value, and
   the drive mechanism to provide signals to the drive mechanism to alter the position of the housing about the single axis based on at least one of the photosensor difference value and the inclinometer difference value.

5. The solar tracking system of claim 1, further comprising a boundary line on a first plane substantially equidistant from the center point of the first photosensor and the center point of the second photosensor wherein the linear slit of the opening and the boundary line form a second plane approximately perpendicular to the first linear distance.

6. The solar tracking system of claim 1, further comprising a third and fourth photosensor, wherein the third and fourth photosensors are positioned along the first linear distance, wherein the third photosensor comprises a third output and the fourth photosensor comprises a fourth output, and
   the difference calculating module coupled to the third output and the fourth output, wherein the difference calculating module determines the difference value using signals from the first output, the second output, the third output, and the fourth output.

7. The solar tracking system of claim 1, wherein the first and second photosensors are monolithic.

8. The solar tracking system of claim 1, further comprising an ultraviolet radiation blocking window.

9. The solar tracking system of claim 1, wherein the linear slit is dimensioned to allow solar radiation to reach the first and second photosensors from a first solstice to a second solstice without rotating the housing north or south along an east-west axis when the solar tracking system is placed such that the single tilt axis is substantially a north-south axis.

10. The solar tracking system of claim 4, wherein the solar collector is fixedly coupled to the housing such that the position of the solar collector is altered about the single axis when the drive mechanism alters the position of the housing about the single tilt axis.

11. The solar tracking system of claim 1, wherein, when the sign of the photosensor difference value is determined to be positive, the housing is rotated in a first direction and, when the sign of the difference value is determined to be negative, the housing is rotated in a second direction opposite the first direction.

* * * * *